(12) United States Patent
Wang et al.

(10) Patent No.: US 11,312,640 B2
(45) Date of Patent: Apr. 26, 2022

(54) METHOD AND DEVICE FOR ENHANCED WATER PRODUCTION IN SOLAR-POWERED DEVICES

(71) Applicant: KING ABDULLAH UNIVERSITY OF SCIENCE AND TECHNOLOGY, Thuwal (SA)

(72) Inventors: Peng Wang, Thuwal (SA); Yifeng Shi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/758,664

(22) PCT Filed: Sep. 21, 2018

(86) PCT No.: PCT/IB2018/057333
§ 371 (c)(1),
(2) Date: Apr. 23, 2020

(87) PCT Pub. No.: WO2019/086971
PCT Pub. Date: May 9, 2019

(65) Prior Publication Data
US 2020/0354233 A1 Nov. 12, 2020

Related U.S. Application Data

(60) Provisional application No. 62/578,656, filed on Oct. 30, 2017.

(51) Int. Cl.
*C02F 1/14* (2006.01)
*B01D 1/00* (2006.01)
(Continued)

(52) U.S. Cl.
CPC .............. *C02F 1/14* (2013.01); *B01D 1/0035* (2013.01); *B01D 1/22* (2013.01); *B01D 5/006* (2013.01);
(Continued)

(58) Field of Classification Search
CPC .......... B01D 5/006; B01D 1/0035; C02F 1/14
See application file for complete search history.

(56) References Cited

U.S. PATENT DOCUMENTS 2,402,737 A * 6/1946 Delano ..................... C02F 1/14
203/10
2,788,316 A * 4/1957 Bjorksten ............... F24S 10/00
202/234

(Continued)

FOREIGN PATENT DOCUMENTS

| DE | 2263854 A1 | 7/1974 |
|---|---|---|
| DE | 3618279 A1 | 10/1987 |
| DE | 202011051461 U1 | 11/2011 |

OTHER PUBLICATIONS

Amri, A., et al., "Developments in the Synthesis of Flat Plate Solar Selective Absorber Materials Via Sol-Gel Methods: A Review," Renewable and Sustainable Energy Reviews, Aug. 2014, vol. 36, pp. 316-328.

(Continued)

*Primary Examiner* — Jonathan Luke Pilcher
(74) *Attorney, Agent, or Firm* — Patent Portfolio Builders PLLC

(57) ABSTRACT

A solar-powered system including a chamber that is bordered by an evaporation layer and a condensation layer; and a photothermal layer located over the evaporation layer so that sun rays incident on the photothermal layer are transformed into heat and the heat is supplied to the evaporation layer for evaporating water. The sun rays incident on the
(Continued)

photothermal layer do not pass through the condensation layer prior to arriving at the photothermal layer.

12 Claims, 7 Drawing Sheets

(51) Int. Cl.
    *B01D 1/22*     (2006.01)
    *B01D 5/00*     (2006.01)
    *C02F 1/04*     (2006.01)
    *C02F 103/08*     (2006.01)
    *C02F 103/34*     (2006.01)

(52) U.S. Cl.
    CPC .......... *B01D 5/009* (2013.01); *B01D 5/0015* (2013.01); *C02F 1/043* (2013.01); *C02F 2103/08* (2013.01); *C02F 2103/34* (2013.01)

(56) References Cited

U.S. PATENT DOCUMENTS

| | | | | |
|---|---|---|---|---|
| 2,813,063 A * | 11/1957 | Bjorksten | ............ | B01D 5/0066 47/81 |
| 4,329,204 A * | 5/1982 | Petrek | ............ | C02F 1/14 202/174 |
| 4,329,205 A * | 5/1982 | Tsumura | ............ | B01D 1/26 202/174 |
| 4,421,606 A * | 12/1983 | Tsumura | ............ | C02F 1/14 203/10 |
| 4,475,988 A * | 10/1984 | Tsumura | ............ | B01D 1/26 202/174 |
| 9,771,278 B2 * | 9/2017 | Haynes | ............ | C02F 1/042 |
| 9,884,265 B2 * | 2/2018 | Park | ............ | C02F 1/16 |
| 2008/0099324 A1 * | 5/2008 | Chiu | ............ | C02F 1/14 203/10 |
| 2015/0209686 A1 * | 7/2015 | Park | ............ | B01D 3/146 202/174 |
| 2016/0368784 A1 * | 12/2016 | Haynes | ............ | B01D 1/28 |

OTHER PUBLICATIONS

Cao, F., et al., "A Review of Cermet-based Spectrally Selective Solar Absorbers," Energy & Environmental Science, Feb. 2014, Issue 7, No. 5, 1615, Royal Society of Chemistry.

International Search Report in corresponding/related International Application No. PCT/IB2018/057333, dated Jan. 25, 2019.

Manchanda, H., et al., "A Comprehensive Decade Review and Analysis on Designs and Performance Parameters of Passive Solar Still," Renewables: Wind, Water, and Solar, Nov. 11, 2015, Article No. 17, 24 pages, Springer.

Written Opinion of the International Searching Authority in corresponding/related International Application No. PCT/IB2018/057333, dated Jan. 25, 2019.

* cited by examiner

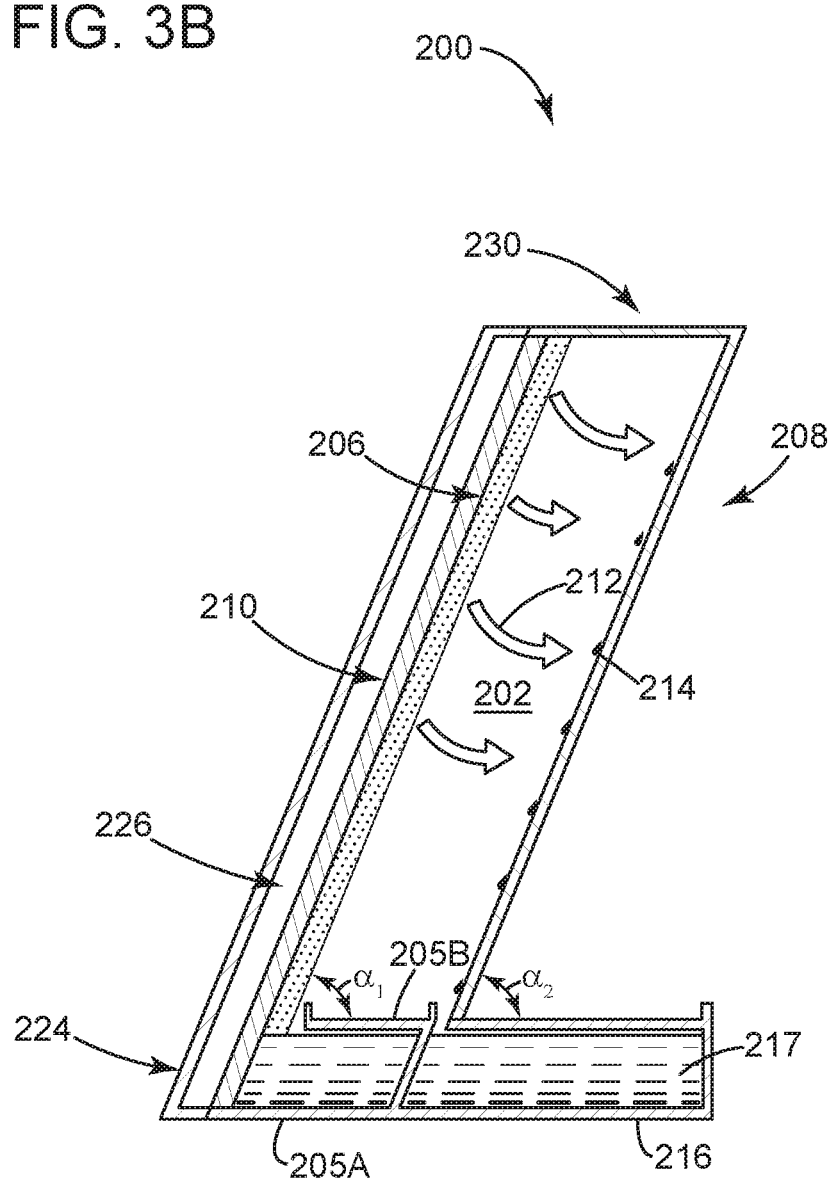

METHOD AND DEVICE FOR ENHANCED WATER PRODUCTION IN SOLAR-POWERED DEVICES

CROSS-REFERENCE TO RELATED APPLICATIONS

This application is a U.S. National Stage Application of International Application No. PCT/IB2018/057333, filed on Sep. 21, 2018, which claims priority to U.S. Provisional Patent Application No. 62/578,656, filed on Oct. 30, 2018, entitled "DEVICES FOR ENHANCED WATER PRODUCTION BY SOLAR STILLS," the disclosures of which are incorporated here by reference in their entirety.

BACKGROUND

Technical Field

Embodiments of the subject matter disclosed herein generally relate to methods and devices for water evaporation, and more specifically, to methods and systems for enhancing water production in solar-powered devices.

Discussion of the Background

Sunlight is the most abundant and accessible renewable energy source. The annual solar energy incident on the Earth's surface is $10^4$ times the current annual global energy consumption. One of the promising options to utilize solar energy is the solar-driven water evaporation process, also known as solar steam generation. This method is widely utilized in various applications. One of them is the solar distillation, which uses solar-driven water evaporation to produce steam and then collects the condensate as fresh water.

Solar distillation is able to effectively deal with a variety of water sources, including seawater, industrial wastewater, brine, brackish water, etc. Unlike other water-related technologies, solar distillation does not involve any moving parts, electronic devices and high pressure operations, which makes it attractive and economically viable especially for small to medium scale applications. The solar-driven water evaporation process also has a great potential for many types of water removal processes, such as in wastewater treatment, to reduce the volume of the wastewater and to incidentally obtain fresh water, especially in oil and energy sectors.

A conventional passive solar still (see "Renewables: Wind, Water, and Solar," A comprehensive decade review and analysis on designs and performance parameters of passive solar still, December 2015) 100, as illustrated in FIG. 1, has a container 102 that holds water 104. A black photothermal paint 106 that absorbs sunlight 108 is coated on the bottom of the container 102. The top of the container 102 is covered with a glass panel 110 for allowing the sunlight to enter inside the container and heat the water. The water source 104 sits on top of the photothermal paint 106. The sunlight 108 enters through the glass cover 110 and hits the water surface first, before reaching the bottom photothermal layer 106. The entire water source 104 is slowly heated up during daytime due to the direct exposure to the sunlight and also due to the heat released by the photothermal paint 106.

Part of the water source 104 evaporates forming vapors 112, which move upward and arrive at the glass cover 110. Because the glass cover is cooler than the water vapors, the water vapors condensate on the glass cover, forming a condensate 114. The condensate 114 includes pure (distilled) water. All the impurities and/or salts from the water source 104 are left with the water source. The purified water 114 falls due to the gravity (the glass cover is tilted) to an output 116. In this way, pure water is separated from the water source 104. Note that the water source 104 may be a mixture of water and any other species of atoms.

Solar stills have a variety of structural configurations, FIG. 1 being one example of a solar still. However, one commonality of the existing solar stills is that the water vapor condensation surface 110 is in the light path 109 before the light 108 reaches the photothermal layer 106 in these devices. In other words, the sunlight 108 has to pass through the water vapor condensation surface 110 before being adsorbed by the photothermal material 106, which inevitably generates a set of problems in these conventional devices.

A couple of these problems are as follow: (1) The condensing water droplets 114 reflect the incoming light, undesirably reducing the amount of light energy captured by the solar still. (2) In the conventional solar still devices, the water condensation surface 110 must be transparent to the solar light and must be maintained transparent or otherwise the amount of light that enters the solar still is reduced. This restrictive condition limits the choices of the materials for the water condensation surface 110 to only glasses and plastics with low thermal conductivity. The low thermal conductivity of the water condensation materials thus limits the heat dissipation, leading to undesirably high temperature of these surfaces, which is counterproductive to the water condensation.

Thus, the existing methods and devices are limited in the sense that their efficiency is kept low by the limited selection of the water condensation materials and by the fact that the sun light that is used to evaporate the water has to pass through the condensation material prior to arriving at the evaporation layer. Therefore, there is a need for a method and device for water purification that overcomes the limitations noted above.

SUMMARY

According to an embodiment, there is a solar-powered system that includes a chamber that is bordered by an evaporation layer and a condensation layer and a photothermal layer located over the evaporation layer so that sun rays incident on the photothermal layer are transformed into heat and the heat is supplied to the evaporation layer for evaporating water. The sun rays incident on the photothermal layer do not pass through the condensation layer prior to arriving at the photothermal layer.

According to another embodiment, there is a method for evaporating water from a fluid source. The method includes a step of adding a fluid source to a solar-powered system, a step of exposing a photothermal layer of the solar-powered system to sun rays, a step of evaporating water from the fluid source with an evaporation layer of the solar-powered system, a step of condensing vapor water from inside the solar-powered system onto a condensation layer, and a step of collecting clean water from the condensation layer. The sun rays incident on the photothermal layer do not pass through the condensation layer prior to arriving at the photothermal layer.

According to yet another embodiment, there is a solar-powered system that includes a chamber that is bordered by an evaporation layer and a condensation layer and a photothermal layer located over the evaporation layer so that sun rays incident on the photothermal layer are transformed into heat and the heat is supplied to the evaporation layer for evaporating water. The evaporation layer forms a top of the chamber and the condensation layer forms lateral walls of the chamber.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 3B illustrates still another solar-powered device in which a condensation layer is located to avoid interference with sun rays falling onto an evaporation layer;

DETAILED DESCRIPTION

Figure 1:
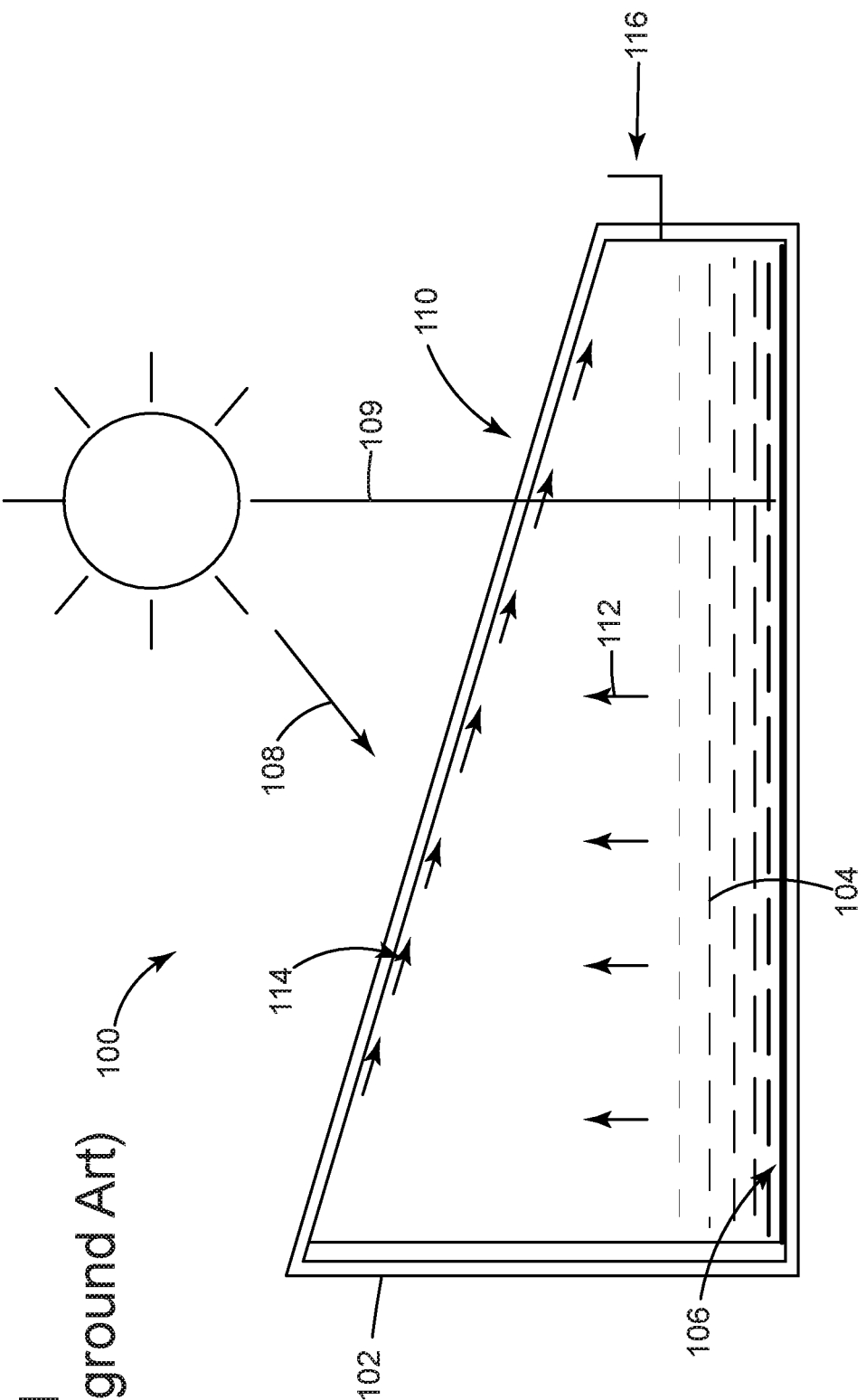
FIG. 1 illustrates a traditional solar still.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a solar-powered system that is used to evaporate water from a water source. However, the invention is not limited to this scenario, but it may be used to evaporate water or another fluid from any fluid source.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a solar still configuration is introduced which is different from the existing ones in the sense that this configuration judiciously places the condensation layer out of the light's pathway toward the evaporation layer. Thus, according to this configuration, the solar light bypasses the condensation layer and interacts directly with the evaporation layer. One or more possible benefits of this configuration are as follows:

(1) Because the condensation layer (or plate) is out of the light's path toward the photothermal material, the condensing water droplets on the condensation layer would not affect the light adsorption of the photothermal materials.

(2) Because the condensation layer is not in the light's path toward the evaporation layer, the condensation layer can be independently optimized for its own purpose, i.e., high water evaporation rate at equilibrium. For example, the condensation layer can be placed in a place with less or no light exposure, which is beneficial for lowering its temperature and thus, for accelerating the water condensation process. In one embodiment, as discussed later, the condensation layer can be placed under a shading structure to keep the condensation layer out of sunlight exposure.

(3) With the physical separation of the two surfaces (namely, the condensation layer and the light adsorbing layer), the transparency requirement of the condensation layer in the conventional devices is successfully removed, which widely expands the choices for the materials of the condensation layer. Such materials may be materials with extremely high-thermal conductivity e.g., Cu, Al, Ag, Fe, Zn, Ni, Cr, and their alloy, steel, brass, SiC, carbon-based material, etc. The condensation layer with high thermal conductivity would permit high heat dissipation and thus, lower the surface's temperature, which is very beneficial to improved water condensation rate by the solar still system as a whole. By lowering the working temperature of the entire solar still, the heat loss in the parts other than the condensation surface can be significantly decreased.

(4) The solar still configuration also allows for structural design for the condensation layer being independent of the photothermal layer. For example, the external surfaces of the condensation layer, whose internal surface inside the solar still has water condensation taking place, can be freely designed (1) to have a grooved surface morphology with high surface area or (2) to have surface water evaporation so to greatly promote the water condensation-generated-heat into the ambient air. The external surface of the evaporation layer can be conveniently produced, for example, by sticking a capillary surface or a wet cotton cover directly on the external surface of the evaporation layer.

Figure 2:
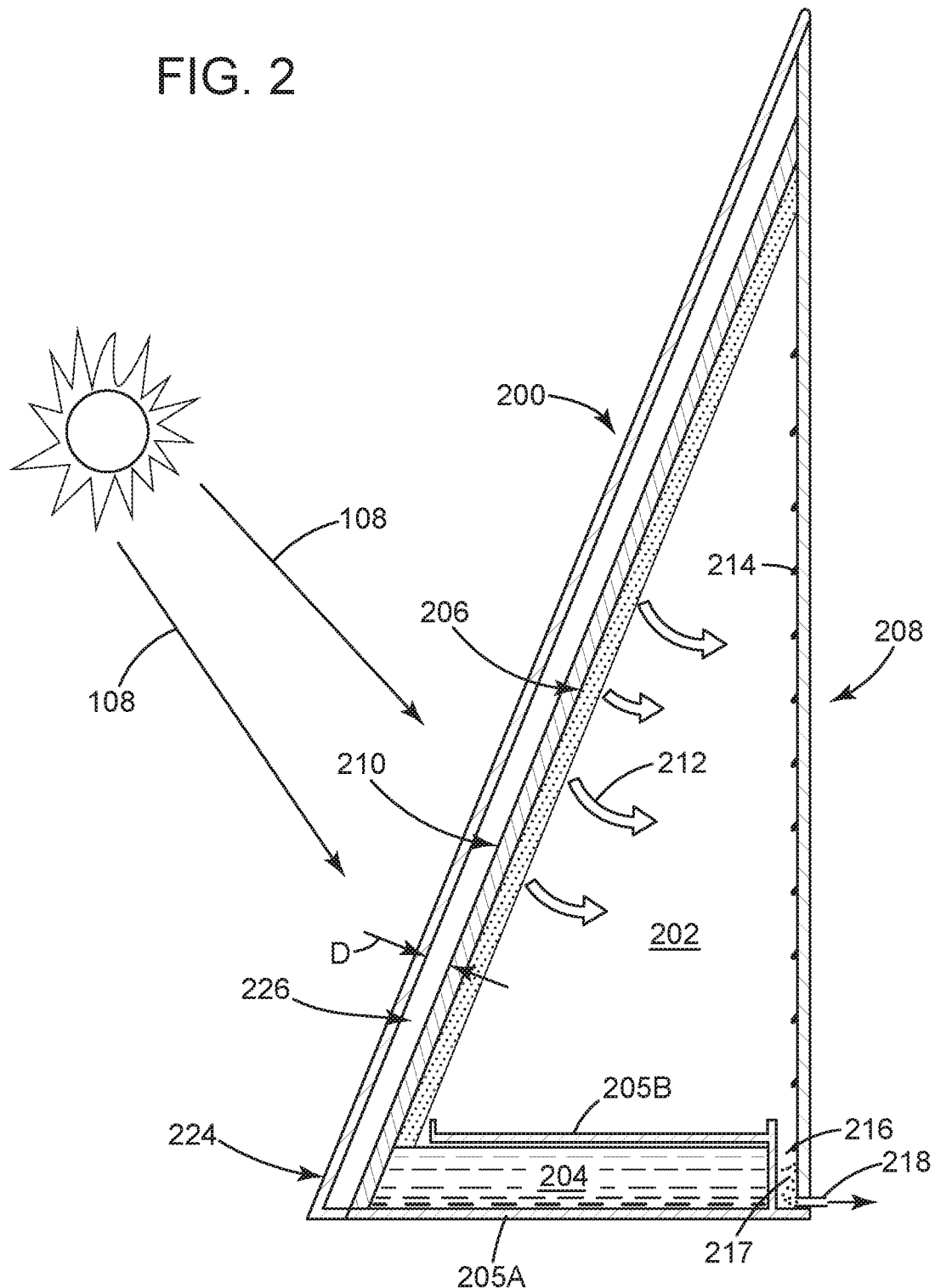
FIG. 2 illustrates a solar-powered device in which a condensation layer is located to avoid interference with sun rays falling onto an evaporation layer.

A specific implementation of such a solar still is now discussed with regard to FIG. 2. Solar-powered device 200 has an internal chamber 202 bordered at a first side by a fluid source 204 (e.g., a water source; however, those skilled in the art would understand that this configuration of the solar still may be used with another fluid, different from water, which has a low evaporation point), at a second side by an evaporation layer 206, and at a third side by a condensation layer 208. The fluid source 204 itself is bordered by a base layer 205A and a top layer 205B so that the fluid cannot escape outside the source. The evaporation layer 206 and the condensation layer 208 meet each other at the top of chamber 202.

A photothermal layer 210 may be provided over an external surface of the evaporation layer 206. Note that in this embodiment, the terms "external" and "internal" use the chamber 202 as reference, i.e., the surface of a layer that faces the chamber is "internal" and a surface of the layer that is opposite to the chamber is "external." The photothermal layer 210 promotes the transformation of the solar energy into heat, for increasing a temperature of the evaporation layer 206. An increase in the temperature of the evaporation layer 206 is beneficial to the water evaporation, which arrives at the evaporation layer from the water source 204. In one application, the photothermal layer absorbs most of the incident sun light 108 so that essentially no sunlight enters inside chamber 202.

The vapors 212 generated by the evaporation layer 206 travel then toward the condensation layer 208. When the vapors 212 contact the condensation layer 208, due to the lower temperature of the condensation layer 208 (note that no or minimal light falls onto the condensation layer), the vapors condensate to form small droplets of water 214. Due to the gravity, the droplets of water 214 fall to the bottom of the condensation layer 208, where there is a collection chamber 216 that accumulates the distilled water 217. This collection chamber 216 (or groove or channel) communicates with an output 218, which takes the distilled water 217 outside the solar-powered device 200.

Optionally, for increasing the efficiency of the device 200, a transparent layer 224 (e.g., made of glass of plastic) may be placed over the photothermal layer 210, at a predetermined distance D, to form an insulation layer 226. The insulation layer 226 may include air at atmospheric pressure, air at a lower pressure, vacuum, or a noble gas.

Figure 3A:
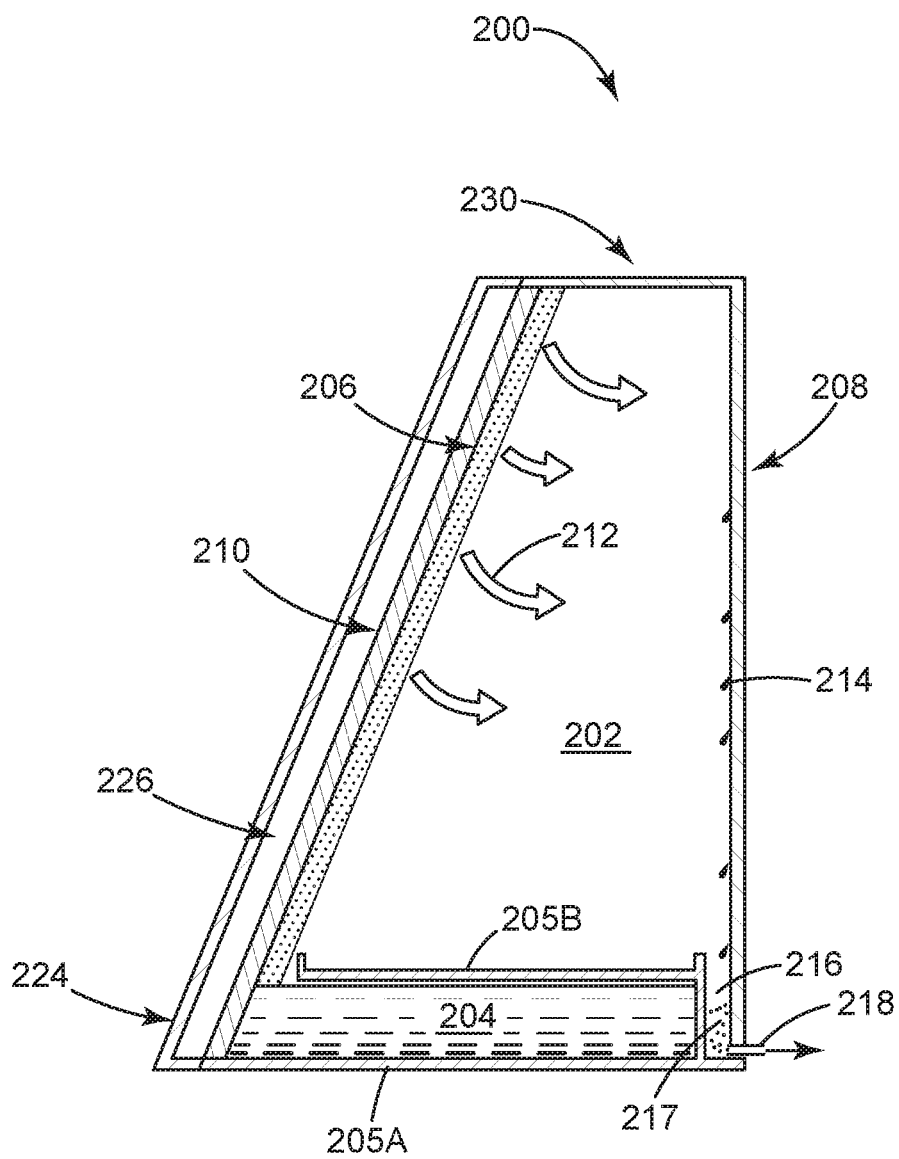
FIG. 3A illustrates another solar-powered device in which a condensation layer is located to avoid interference with sun rays falling onto an evaporation layer.

A first modification of the solar-powered device 200 is shown in FIG. 3A. This device is identical to the one shown in FIG. 2 except that the evaporation layer 206 and the condensation layer 208 do not meet at a top portion. Instead, a thermal insulation layer 230 is formed at the top to close the chamber 202. The configurations shown in FIGS. 2 and 3A suggest that the condensation layer 208 is substantially perpendicular to the base layer 205A while the evaporation layer 206 makes an angle, different than 90°, with the same base layer 205A. However, in one application, the condensation layer 208 may make an angle different than 90°, with the base layer 205A. In still another embodiment, the evaporation layer 206 may make a 90° angle with the base layer 205A. In yet another embodiment, both the evaporation layer and the condensation layer may make a 90° angle with the base layer 205A.

A second modification of the solar-powered device 200 is shown in FIG. 3B. In this configuration, the condensation layer 208 is not perpendicular to the base layer 205A, but rather it makes a given non-zero angle with it. More specifically, as illustrated in FIG. 3B, the evaporation layer 206 makes a first angle $\alpha_1$ with the base layer 205A while the condensation layer 208 makes a second angle $\alpha_2$ with the same base layer. While the first angle is larger than zero and smaller than 90° for the embodiment of FIG. 3A, the second angle is 90° for the same embodiment. Different from this, the embodiment of FIG. 3B has the second angle also larger than zero and smaller than 90°. In one embodiment, the first angle is equal to the second angle, i.e., the condensation layer is substantially parallel to the evaporation layer as shown in FIG. 3B.

Figure 4:
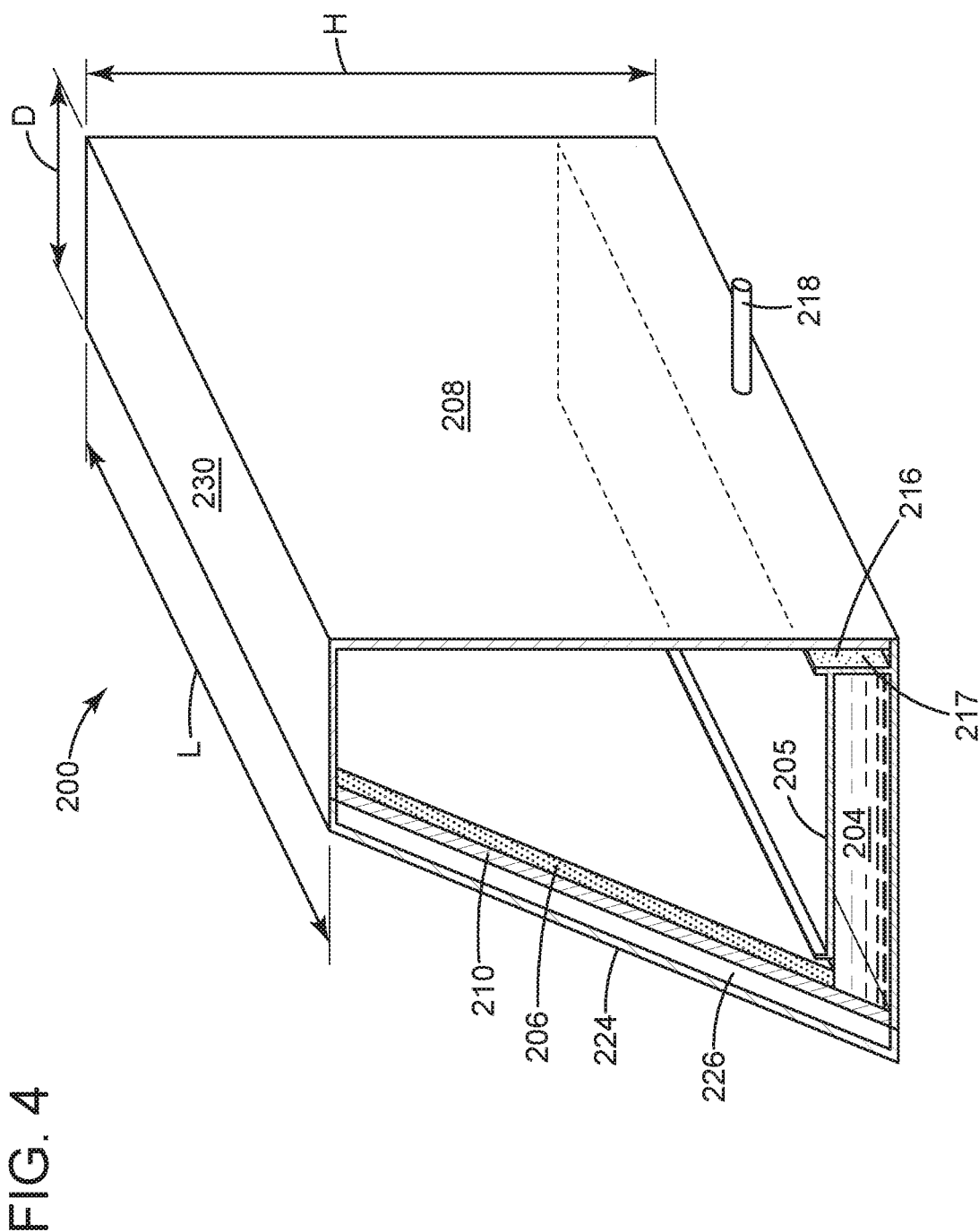
FIG. 4 illustrates a three-dimensional structure of a solar-powered device in which a condensation layer is located to avoid interference with sun rays falling onto an evaporation layer.

FIGS. 2 to 3B show a cross-section view of the device 200. The entire device 200 may look like the structure shown in FIG. 4, i.e., the device has a three-dimensional (3D) configuration characterized by a given length L, depth D and height H. One skilled in the art would understand that the length L can be linear or curved. The range for the sizes L, D, and H may be between couple of millimeters and tens of meters. In one application, the 3D structure may curve so much so that the solar-powered device 200 has a conical shape, with the condensation layer 208 forming an interior cylinder and the interior of this cylinder being open to the atmosphere. Those skilled in the art, having the benefit of reading this description, could also consider other 3D shapes for the device 200.

One way to use the various configurations of the solar-powered device 200 illustrated in FIGS. 2 to 3B is now discussed. The photothermal layer 210 faces the sunlight and the condensation layer 208 is on the backside of the solar-powered device 200, thus avoiding direct contact with the sunlight. The water source 204 is stored at the bottom of the device. The evaporation layer 206 is placed right underneath the photothermal layer 210 and the evaporation layer 206 can be connected with the photothermal layer directly or via an intermediate layer with high thermal conductivity. In one application, the evaporation layer 206 is a hydrophilic porous membrane, i.e., a layer that absorbs the fluid from the fluid source 204. As shown in all embodiments illustrated in FIGS. 2 to 3B, the evaporation layer dips into the fluid source, i.e., is in direct contact with the fluid in the fluid source. Because of the hydrophilic property of the evaporation layer 206, the fluid from the source 204 is automatically absorbed into the evaporation layer 206, for example, due to the capillary effect and/or the transpiration effect. Thus, for this embodiment, there is no need to pump the fluid over the evaporation layer. However, one skilled in the art would know to modify these configurations to add an electrical pump to further spread the fluid from the fluid source 204 over the evaporation layer 206, if necessary.

When exposed to the sunlight, the photothermal layer 210 captures the sunlight energy and converts it to heat. The generated heat leads to a temperature increase of the photothermal layer 210, which results also into an increase temperature of the evaporation layer 206, as well as the fluid inside the pore space of the evaporation layer 206. This increase in temperature accelerates the liquid-to-vapor transformation of the fluid inside the evaporation layer 206. During the evaporation process, solar energy is converted to heat energy and then to latent heat of the water vapor. The condensation layer has a lower temperature because it is placed on the back side of the solar-powered device and not exposed to the sunlight.

The warm fluid vapor 212 generated in the evaporation layer 206 diffuses to the colder condensation layer 208, as illustrated in FIGS. 2 to 3B, and transforms back to liquid water 214, i.e., water condensate. During this condensation process, the latent heat of the water vapor is dissipated to the condensation layer 208, which then drains it into the surroundings. The condensate water 214 falls due to the gravity at the bottom of the device, where is collected as clean water 217. A larger temperature gradient between (1) the photothermal layer 210 and the evaporation layer 206 and (2) the condensation layer increases the clean water production rate. This is achieved by not exposing the condensate layer to the sun rays that fall upon the photothermal layer.

In one embodiment, to minimize the convection heat loss of the photothermal layer 210 to the ambient air (outside chamber 202), a transparent layer 224 (e.g., glass cover) may be placed on top of the photothermal layer, as shown in FIGS. 2 to 3B. Note that this layer is optional. In one application, it is possible to create a vacuum space layer 226 between the photothermal layer 210 and the transparent layer 224, to further diminish the conduction heat loss. Another improvement of the device shown in FIGS. 3A and 3B, which reduces the heat conduction from the photothermal layer 206 and the evaporation layer 208 to the condensation layer 208, is a thermal insulation part 230 (see FIG. 3A or 3B) that is placed to thermally separate these layers.

Figure 5:
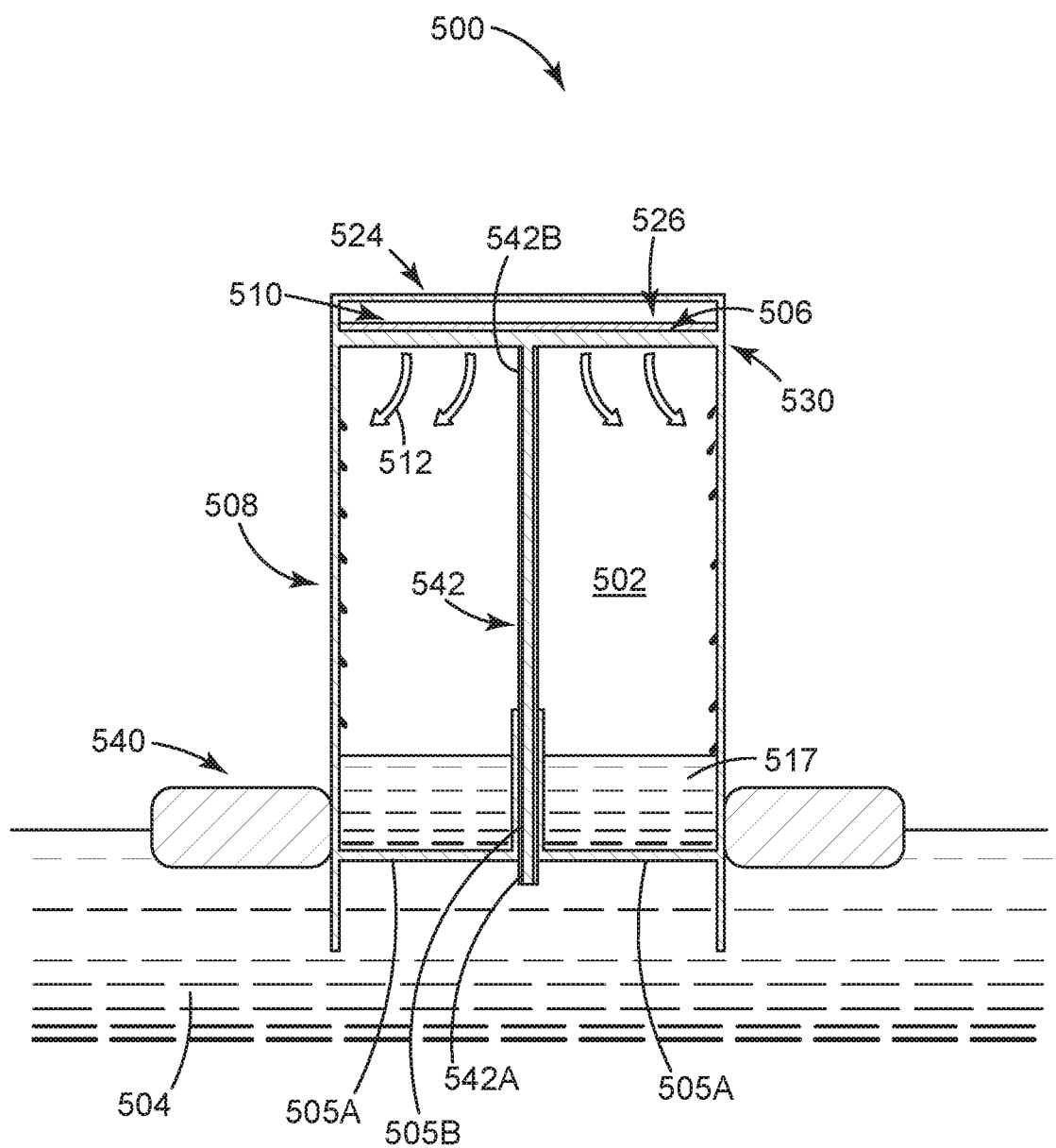
FIG. 5 illustrates yet another solar-powered device in which a condensation layer is located to avoid interference with sun rays falling onto an evaporation layer.
Figure 6:
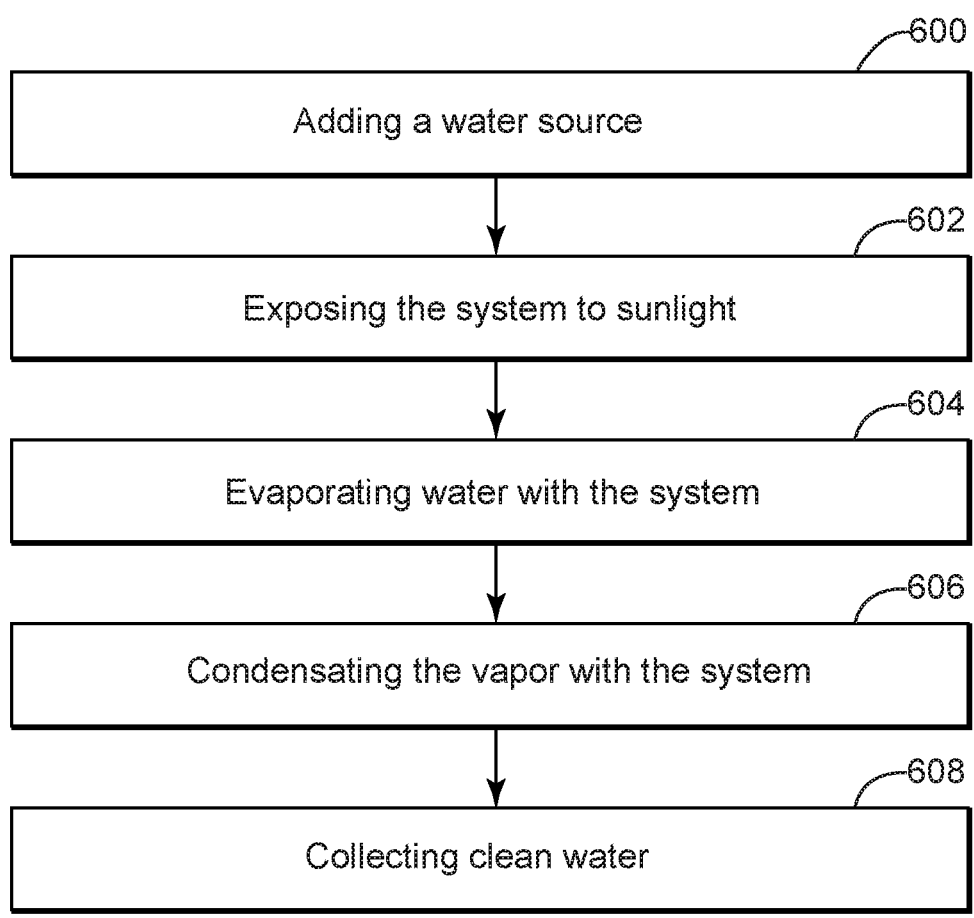
FIG. 6 is a flowchart of a method for evaporating water with a solar-powered system.

A different solar-powered device is illustrated in FIG. 5 and now discussed. Device 500 has no tank for the fluid source 504. In other words, device 500 is designed to be directly put on top of a fluid source 504, such as a lake, river, seawater, wastewater, etc. A floating mechanism 540 is attached to device 500 for making the device 500 float on the fluid source 504. In one embodiment, the floating mechanism 540 is a floating foam. Those skilled in the art would understand that other mechanisms and/or means may be used to make the device 500 float. The self-floating property of device 500 can also be provided by the walls of the device.

In this embodiment, the photothermal material 510 is placed on the top of the device and the condensation layer(s) 508 may be the side faces of the solar-powered device 500, as shown in FIG. 5. The evaporation layer 506 may be placed beneath the photothermal layer 510 (in a horizontal position), so that a maximum energy transfer is achieved. The evaporation layer 506 may be a hydrophilic porous membrane and the fluid from the fluid source 504 is transported to the evaporation layer 506 by a fluid channel layer 542, as illustrated in FIG. 5. The fluid is absorbed into the evaporation layer 506 due to the capillary effect and/or the transpiration effect from the fluid channel layer 542.

The fluid channel layer 542 may be located inside the chamber 502 and may be made of a material that exhibits small tubes/channels that promote capillarity. Therefore, no electric water pump is needed in this design. In one embodiment, the fluid channel layer 542 can be placed outside of the chamber 502, as long as it can transfer the fluid from the source 504 to the evaporation layer 506. In one embodiment, the fluid channel layer 542 has a profile that is a straight line, as illustrated in FIG. 5. However, in another embodiment, the profile of the fluid channel layer is curved.

The fluid channel layer 542 extends with one end 542A into the fluid source 504 and with the other end 542B touches the evaporation layer 506. Note that at one end of the chamber 502, toward the fluid source 504, a base layer 505A is provided to separate the chamber 502 from the fluid source 504. In one embodiment, the base layer 505A continues with a lateral wall 505B, which extends up and vertically, inside the chamber 502. The lateral wall 505B surrounds the fluid channel layer 542, thus preventing the fluid from the fluid source 504 to penetrate inside the chamber 502. At the same time, the intimate contact between the fluid channel layer 542 and the lateral wall 505B prevents the collected condensate water 517 from exiting chamber 502.

When exposed to the sunlight, the photothermal layer 510 captures the sunlight and converts it to heat and the generated heat increases the temperatures of the photothermal layer, the evaporation layer 506, as well as the fluid inside the pore space of the evaporation layer 506, leading to an accelerated water evaporation rate. The condensation layer 508 forms in this embodiment the internal faces of the lateral wall of the solar-powered device 500, and the condensation layer has a lower temperature than the top of the device, i.e., the photothermal and evaporation layers. The warm vapor 512 generated in the evaporation layer 506 diffuses to the colder condensation layer 508 and condenses there as water droplets 514. The condensate water 514 is then collected as clean water at the bottom of the device, in a container formed by the base layer 505A and the lateral wall 505B.

In order to diminish the convection heat loss from the photothermal layer to the ambient air, a glass cover 524 can be placed on top of the photothermal layer 510 and a vacuum space layer 526 can then be made between the photothermal layer and the glass cover. The glass cover along with the vacuum space layer can improve the energy efficiency of the device, but is not a necessary part of the configuration.

As a further improvement, a thermal insulator layer 530 may be provided around the photothermal layer and the evaporation layer to separate them from the condensate layer, as illustrated in FIG. 5. The thermal insulator layer 530 decreases the heat conduction from the photothermal layer and the evaporation layer to the condensation layer. In this embodiment, the condensation layer is extended downward and partially immersed into the fluid source 504 water body, which facilitates the heat dissipation from the condensation layer to the cool fluid source, which may further lead to improved water condensation rate.

A few considerations that are applicable to one or more of the embodiments discussed above are now discussed. To create a fast heat dissipation from the condensation layer to its surroundings, the condensation layer should possess good thermal conductivity. However, in the conventional solar stills, the condensation layer has to be transparent to allow the sunlight to arrive at the photothermal layer (see FIG. 1). Generally, transparent materials all have poor thermal conductivity. For example, glass has a thermal conductivity of 1.1 W/mK, polycarbonate (PC) has 0.19-0.22 W/mK, polyethylene terephthalate (PET) has 0.15-0.24 W/mK, high density polyethylene (HDPE) has 0.45-0.52 W/mK, and low density polyethylene (LDPE) has 0.33 W/mK.

Because the solar-powered devices discussed herein distribute the layers so that the condensation layer does not have to allow the sunlight to pass through, according to an embodiment, the condensation layer may be made of materials with high thermal conductivity (i.e., materials that are not transparent to sunlight), such as copper (401 W/mK), zinc (116 W/mK), aluminum (237 W/mK), brass (109 W/mK), bronze (110 W/mK), graphite (168 W/mK), Ag (429 W/mK), silicon carbide (360-490 W/mK), iron (73 W/mK), stainless Steel (12-45 W/mK), and tin (62-68 W/mK) among others.

The internal surfaces of the condensation layer (i.e., surfaces for water condensation) can be designed to have various surface structures (e.g., grooves), or surface chemistry (various chemical elements distributed along the surface) to improve the surface wettability, which positively alter the water vapor condensation rates.

The external surfaces (i.e., surfaces facing the ambient air) of the condensation layer can be made to have grooved surface structure to increase its heat dissipation surface area. To further increase their heat dissipation efficiency, these external surfaces can be coated with materials having high emissivity.

The photothermal layer discussed in the previous embodiments may include all kinds of existing and potentially possible materials that have strong light absorption capability in the solar spectrum range, such as but not limited to metal nanoparticle (gold, silver, copper, cobalt, iron, nickel, aluminum, and there alloys), carbon based materials (carbon black, carbon nanotubes, graphene, graphene oxide, reduced graphene oxide, etc.), black metal oxides ($Co_3O_4$, $MnO_2$, $Ti_2O_3$, $Fe_3O_4$, $CuCr_2O_4$, $FeCr_2O_4$, $CuMn_2O_4$, $MnFe_2O_4$, $ZnFe_2O_4$, $MgFe_2O_4$, etc.), black metal chalcogenides ($MoS_2$, $MoSe_2$, $WSe_2$, CdS, CdTe, etc.), black paint and black cement materials, and various kinds of black polymer materials. In one embodiment, the photothermal material to be used in the solar-powered devices presented in the figures can be spectrally selective absorber materials with low thermal radiation, as disclosed in, for example, "A review of cermet-based spectrally selective solar absorbers," *Energy Environ. Sci.*, 2014, 7, 1615; or "Developments in the synthesis of flat plate solar selective absorber materials via sol-gel methods: a review," *Renewable and Sustainable Energy Reviews* 36 (2014) 316-328).

In case that the fluid source is not limited in its supply, e.g., a lake, a pond, etc, an additional evaporation layer can be added on the outer surface of the condensation layer, for utilizing the water evaporation to further cool down the condensation layer.

The photothermal layer can be porous or nonporous. In case of the photothermal layer being porous, an intermediate layer is then placed between the photothermal layer and the evaporation layer to keep the water from outside the device from contacting the evaporation layer and to provide mechanical strength and heat conductivity ($>1$ w m$^{-1}$k$^{-1}$). In case of the photothermal layer being non-porous, the intermediate layer can be porous or non-porous or can also be absent. The pore size of the hydrophilic and porous evaporation layer should be less than 1 mm to ensure a strong capillary force to pull water from the fluid source. Evaporation materials to be used for the evaporation layer can be paper, quartz glass fibrous membrane, carbon paper, copper foam, carbon foam, polymer foam, macroporous silica, or equivalent materials.

In any of the configurations discussed with regard to the figures, an additional heat exchange unit can be added to the solar-powered device on its condensation layer, in which the source water is used as cooling water to decrease the temperature of the condensation layer. In this sense, the additional heat exchange unit will recycle part of the heat that is released by the condensation process and at the same time increases the temperature of the fluid source.

The above-discussed configurations make the solar-powered devices free from electric pump operation. However, electric pump(s) can be an option in some systems, where they are used to lift the source water up, and then to have the water flow down on the evaporation layer's surfaces at a controlled flow rate.

According to an embodiment, any of the configuration previously discussed is able to provide stand-alone solar stills, but, if necessary, an external cooling source can be combined into the design for more effective water production.

A method for evaporating water from a fluid source, based on one of the systems discussed above, includes a step 600 of adding a water source 204 to a solar-powered system 200, a step 602 of exposing the solar-powered system 200 to sunlight, a step 604 of evaporating water from the water source 204 with the solar-powered system, a step 606 of condensing vapor water from inside the solar-powered system onto a condensation layer, and a step 608 of collecting clean water. The solar-powered system has the condensation layer located so that the solar rays that evaporate the water do not pass through the condensation layer. In other words, the embodiments discussed above locate the condensation layer in a such a way that the bulk of sun rays that impinge upon the photothermal layer and/or the evaporation layer do not pass through the condensation layer.

The disclosed embodiments provide methods and mechanisms that evaporate and condensate water from a water source in such a way that sunlight rays used to evaporate the water do not pass through a condensation layer. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A solar-powered system comprising:
   a chamber that is bordered by an evaporation layer and a condensation layer, the evaporation layer and the condensation layer contacting each other only at one edge;
   a fluid source located at a bottom of the chamber; and
   a photothermal layer located over the evaporation layer so that sun rays incident on the photothermal layer are transformed into heat and the heat is supplied to the evaporation layer for evaporating water,
   wherein the sun rays incident on the photothermal layer do not pass through the condensation layer prior to arriving at the photothermal layer,
   wherein the evaporation layer is porous and passively absorbs water from the fluid source, and
   wherein the evaporation layer makes a non-zero angle with the condensation layer.

2. The system of claim 1, wherein the evaporation layer absorbs the water by capillarity.

3. The system of claim 2, wherein the photothermal layer is formed directly in contact with the evaporation layer.

4. The system of claim 1, wherein the fluid source is maintained between a base layer and a top layer.

5. The system of claim 4, wherein the top layer separates the fluid source from the chamber.

6. The system of claim 4, wherein the condensation layer is substantially perpendicular to the base layer.

7. The system of claim 6, wherein the evaporation layer makes an angle larger than zero and smaller than ninety degrees with the base layer.

8. The system of claim 1, further comprising:
   a cover layer that extends over the photothermal layer.

9. The system of claim 8, wherein the cover layer and the photothermal layer sandwich a vacuum layer.

10. The system of claim 1, wherein the chamber has a triangular cross-section.

11. A solar-powered system comprising:
    a chamber that is bordered by an evaporation layer and a condensation layer;
    a fluid source located at a bottom of the chamber;
    a photothermal layer located over the evaporation layer so that sun rays incident on the photothermal layer are transformed into heat and the heat is supplied to the evaporation layer for evaporating water,
    wherein the sun rays incident on the photothermal layer do not pass through the condensation layer prior to arriving at the photothermal layer,
    wherein the evaporation layer is porous and passively absorbs water from the fluid source, and
    wherein the evaporation layer makes a non-zero angle with the condensation layer; and
    a thermal insulation layer that forms a top of the chamber, and thermally and physically separates the evaporation layer from the condensation layer,
    wherein an end of the evaporation layer and an end of the condensation layer are connected to opposite ends of the thermal insulation layer to define the chamber.

12. The system of claim 11, wherein the chamber has a trapezoidal cross-section and a top end of the evaporation layer and a top end of the condensation layer are directly connected to the thermal insulation layer.

* * * * *